(No Model.) 2 Sheets—Sheet 1.
W. T. SUMMERS.
COIN OR CHECK CONTROLLED BICYCLE RACK.
No. 600,098. Patented Mar. 1, 1898.
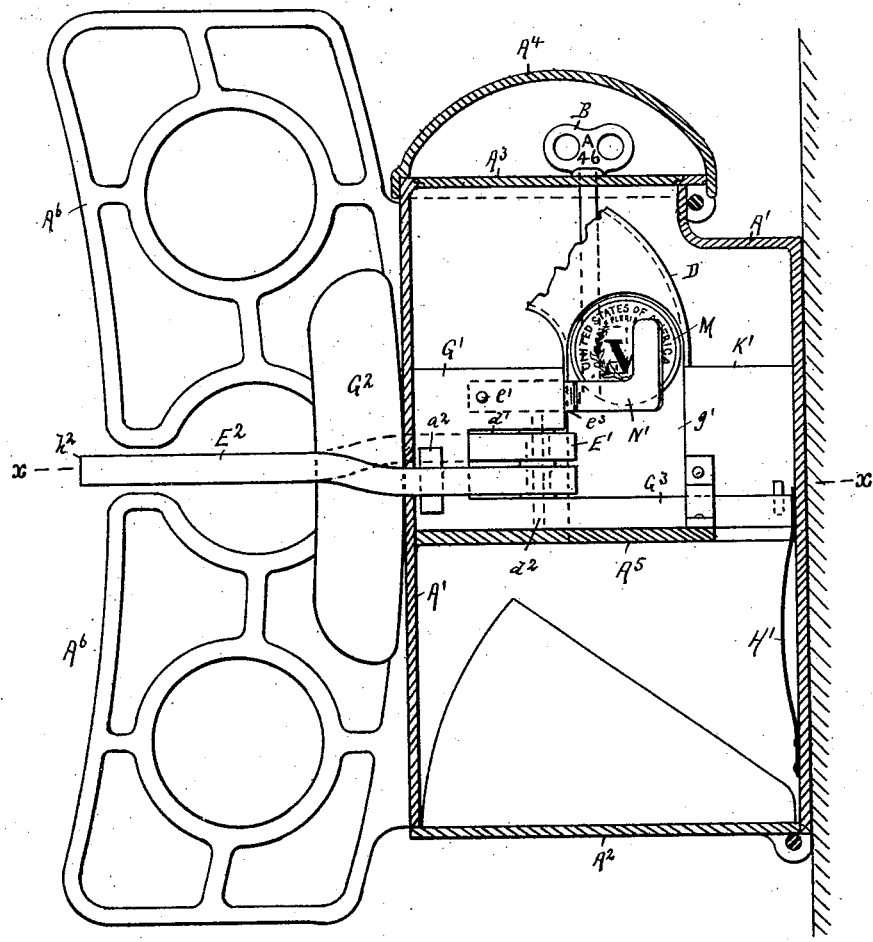
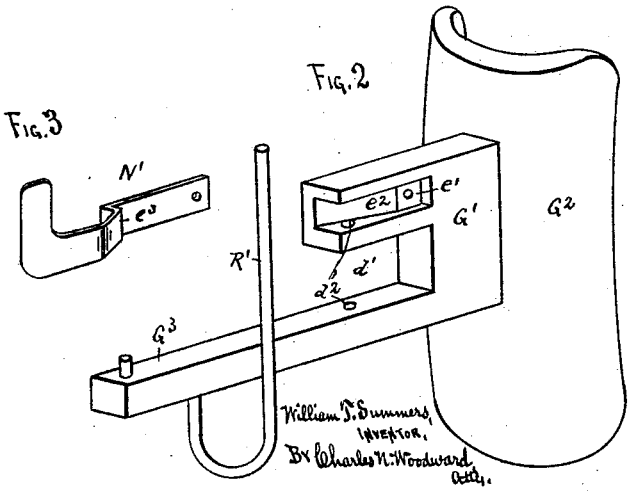

(No Model.) 2 Sheets—Sheet 2.

W. T. SUMMERS.
COIN OR CHECK CONTROLLED BICYCLE RACK.

No. 600,098. Patented Mar. 1, 1898.

WITNESSES.
William T. Summers,
INVENTOR,
By Charles N. Woodward, Atty.

UNITED STATES PATENT OFFICE.

WILLIAM T. SUMMERS, OF ST. PAUL, MINNESOTA.

COIN OR CHECK CONTROLLED BICYCLE-RACK.

SPECIFICATION forming part of Letters Patent No. 600,098, dated March 1, 1898.

Application filed April 26, 1897. Serial No. 634,018. (No model.)

*To all whom it may concern:*

Be it known that I, WILLIAM T. SUMMERS, of St. Paul, in the county of Ramsey and State of Minnesota, have invented certain new and useful Improvements in Coin or Check Controlled Bicycle-Racks, of which the following is a specification.

This invention relates to devices for supporting bicycles temporarily when not in use;
and it consists in a rack combined with an automatically-actuated locking mechanism which can be released only by the insertion of a coin or check, as hereinafter shown and described, and specifically pointed out in the claims.

Figure 4:
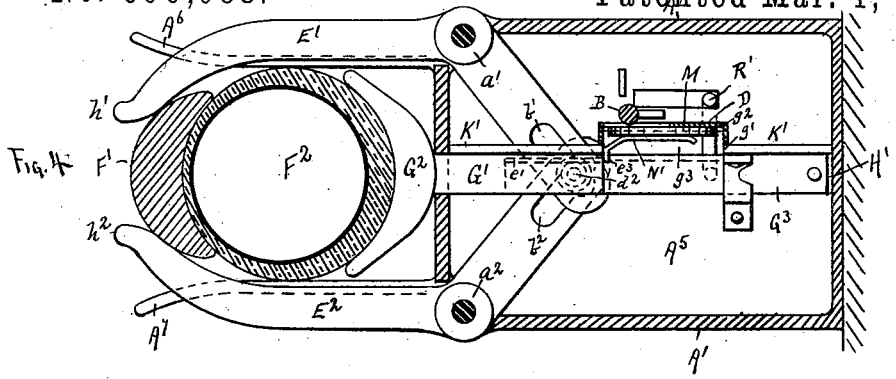
Figure 5:
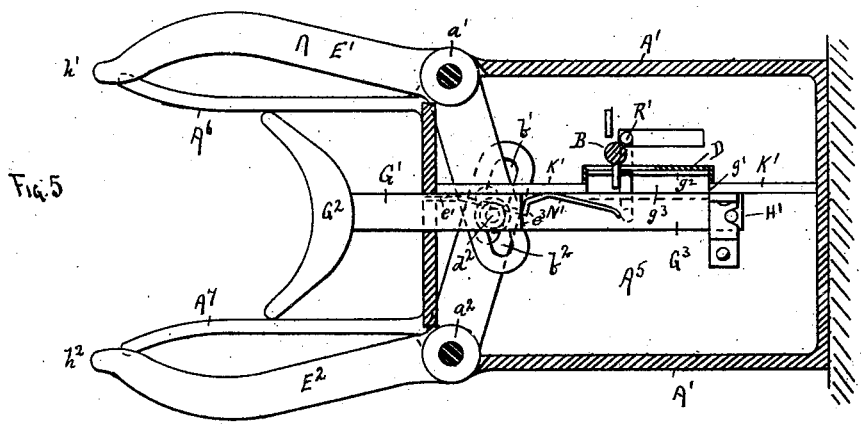
Figure 6:
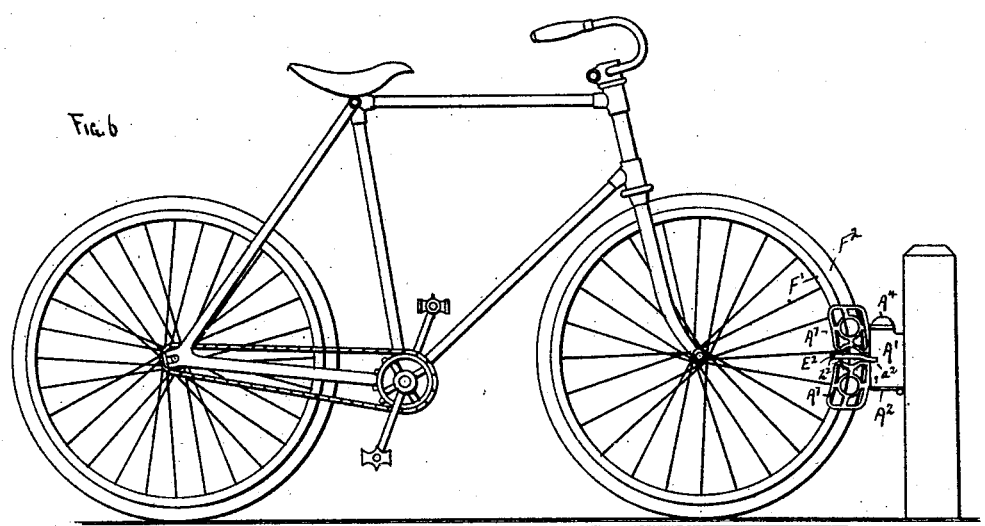

In the drawings, Figure 1 is a sectional side elevation of the device complete. Fig. 2 is a perspective view of the actuating-bolt of the locking mechanism detached. Fig. 3 is a perspective view of the trip-spring detached. Fig. 4 is a cross-sectional view on the line X X of Fig. 1, showing the locking-jaws closed; and Fig. 5 is a similar view with the locking-jaws open. Fig. 6 is a side elevation, on a reduced scale, of a bicycle supported and secured by one of my improved devices.

In this invention is comprised a holder for the bicycle, a bolt connected and arranged to actuate one or more gripping-jaws adapted to enclasp some part of the bicycle and be automatically locked in place to prevent the disengagement of the bicycle until released by a key, and mechanism whereby the action of the key is potent to release the locking mechanism only when a coin or check of a certain predetermined size is inserted.

In the drawings illustrating the invention, A' represents the casing which contains the mechanism and which will have the bottom A² hinged, so as to be readily opened for the removal of the coin, and with a removable top A³ and a cover A⁴, hinged above the top to protect the key B and the entrance to the coin-duct D. The casing is also provided with a cross-partition A⁵, dividing the casing into two compartments, and with wings A⁶ A⁷ projecting from its edges to form supports for the bicycle, preferably a section of one of the rims and tires, as shown. The casing will be attached in any suitable manner to any convenient permanent body—such as a post, fence, wall, or framework—at a height corresponding to the bicycle.

The locking mechanism will consist of one or more arms arranged to embrace that part of the bicycle supported between the wings A⁶ A⁷ and will be arranged to be released only by the insertion of a coin or check of a certain predetermined size.

In Figs. 1, 4, and 5 the arms are shown at E' E², pivoted at $a'$ $a^2$ in the casing A' and curved at their outer ends to enclasp the rim F' and tire F² of the bicycle when closed, as in Fig. 4, and with their inner ends trending inward and crossing each other and provided with slots $b'$ $b^2$.

G' is a bolt fitting through the casing A', between the wings A⁶ A⁷, and with a plate G² on the outer end outside the casing, the plate preferably concaved to conform to the outer surface of the tire F². The bolt G' rests upon the cross-partition A⁵ and has a projecting guide G³, whereby the bolt will be held in place and adapted to slide inward upon the cross-partition A⁵.

The bolt G' has an open slot $d'$, in which the slotted members of the arms E' E² are crossed, so that one single pin passing through the holes $d^2$ can be passed through both of the arms and the bolt, as shown.

H' is a spring to keep the bolt G' and its plate G² normally in their outward position, as shown in Fig. 5.

K' is an upright cross-partition against which the side of the bolt G' runs, and D is the coin-duct, which leads from the cover down to the partition K' and with its lower end against an opening $g'$ in the partition K', so that a coin (represented at M) will be free to pass.

N' is a spring attached at $e'$ in a recess $e^2$ in the bolt G' and with a shoulder $e^3$, adapted to engage with the edge of the opening $g'$ for the coin when the bolt is pushed inward, and thus retain the bolt in its inward position, as shown in Fig. 4.

The spring N' is projected past the center of the coin M and serves to support the coin, as shown.

The bottom of the duct D is provided with a narrow shelf $g^2$, which projects partially under the coin and supports its lower edge, while the spring N' holds it back against the back of the duct.

B is a key whose wards are adapted when the key is turned to pass through an aperture in the back of the duct and press against the coin and displace it from its shelf $g^2$, this movement also disengaging the shoulder $e^3$ and permitting the spring H' to throw the bolt G' outward and thus release the coin, which drops into the lower compartment in the casing through a slot $g^3$, made for that purpose in the cross-partition $A^5$.

By the peculiar form of the arms E' $E^2$ and their manner of attachment to the bolt it will be readily understood that when the bolt is pushed inward the points $h'$ $h^2$ of the arms will be moved inward and enclasp the part of the bicycle placed between the wings $A^6$ $A^7$, and then when the bolt is pushed outward by the spring H' the arms will be moved outward and release the bicycle.

The form of the spring H' will be such that when a coin is not present the key will turn freely and not produce any effect upon the spring or bolt, so that the bolt can be released only when a coin or check is inserted.

R' is a rod connected to the bolt G' or its extension $G^3$ and projecting up into the path of the wards of the key, so that as the bolt is pushed outward the rod R' will be projected behind the key to prevent its removal while the bolt is in its withdrawn position.

In operating this device, the bolt being withdrawn and key being held in place, as above described, the insertion of the bicycle-tire between the wings will push the bolt inward and cause the arms E' $E^2$ to be thrown around the tire and thus lock it to the casing A', while the spring N' will automatically engage by its shoulder $e^3$ and thus lock the arms firmly about the tire. The inward movement of the bolt and the rod R' releases the key, which the owner of the bicycle removes and retains.

When the bicycle is to be released, a coin is dropped into the duct D and falls between the spring N' and the back of the duct. Then the key when turned will release the bolt, and the coin drops into the lower compartment of the casing A'. Thus the bicycle can be released only by the insertion of a coin or a check of a certain predetermined size.

The keys will be made so as not to be interchangeable, so that the holder of the key only can release the bicycle.

The keys and boxes will be numbered or otherwise marked to distinguish and identify them.

Having thus described my invention, what I claim as new is—

1. In a coin or check controlled bicycle-rack, a holder to support the bicycle, a bolt adapted to be actuated by the insertion of the bicycle into the holder, one or more arms adapted to be operated by said bolt to lock said bicycle in said holder, and a mechanism adapted to release said bolt only when a coin or check of a certain predetermined size is introduced therein, substantially as herein set forth.

2. In a coin or check controlled bicycle-rack, a holder to support the bicycle, one or more arms adapted to enclasp the bicycle, means whereby said arm or arms are actuated by the insertion of the bicycle into the holder, and a mechanism adapted to release said arm or arms only when a coin or check of a certain predetermined size is introduced, substantially as and for the purpose set forth.

3. In a coin or check controlled bicycle-rack, a holder to support the bicycle, one or more arms adapted to enclasp the bicycle when in the holder, means whereby said arm or arms are actuated by the insertion of the bicycle into the holder, a mechanism adapted to release said arm or arms only when a coin or check of a certain predetermined size is introduced, a coin-duct leading to said releasing mechanism, and a receptacle to receive said coin when released, substantially as set forth.

In testimony whereof I have hereunto set my hand in the presence of two subscribing witnesses.

WILLIAM T. SUMMERS.

Witnesses:
C. N. WOODWARD,
LEWIS D. MANN.